United States Patent
Sarma et al.

(10) Patent No.: US 7,904,492 B2
(45) Date of Patent: Mar. 8, 2011

(54) METHOD AND APPARATUS FOR CONCURRENT READ-ONLY ACCESS TO FILESYSTEM

(75) Inventors: Joydeep Sarma, Sunnyvale, CA (US); Abhijeet Gole, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 242 days.

(21) Appl. No.: 11/389,421

(22) Filed: Mar. 23, 2006

(65) Prior Publication Data

US 2007/0226270 A1    Sep. 27, 2007

(51) Int. Cl.
*G06F 17/30* (2006.01)

(52) U.S. Cl. ............................ 707/812; 707/822

(58) Field of Classification Search .............. 707/812, 707/822
See application file for complete search history.

(56) References Cited

U.S. PATENT DOCUMENTS

| | | | | |
|---|---|---|---|---|
| 5,175,850 A | * | 12/1992 | Hirata et al. ................. | 707/752 |
| 5,435,004 A | * | 7/1995 | Cox et al. ................... | 707/205 |
| 5,495,607 A | * | 2/1996 | Pisello et al. ............... | 707/797 |
| 6,122,640 A | * | 9/2000 | Pereira ....................... | 707/648 |
| 6,128,622 A | * | 10/2000 | Bach et al. .................. | 717/114 |
| 6,289,335 B1 | * | 9/2001 | Downing et al. ............ | 707/769 |
| 6,389,427 B1 | * | 5/2002 | Faulkner ..................... | 707/741 |
| 6,539,396 B1 | * | 3/2003 | Bowman-Amuah ......... | 707/769 |
| 6,542,909 B1 | * | 4/2003 | Tamer et al. ................ | 707/756 |
| 6,578,050 B1 | * | 6/2003 | Daggubati et al. .......... | 707/782 |
| 6,697,821 B2 | * | 2/2004 | Ziff et al. .................... | 707/706 |
| 6,990,478 B2 | * | 1/2006 | Loy et al. .................... | 707/781 |
| 2003/0101321 A1 | * | 5/2003 | Ohran ......................... | 711/162 |
| 2003/0131207 A1 | * | 7/2003 | Arakawa et al. ............ | 711/162 |
| 2003/0204572 A1 | * | 10/2003 | Mannen et al. ............. | 709/216 |
| 2005/0071560 A1 | * | 3/2005 | Bolik .......................... | 711/117 |
| 2005/0114595 A1 | * | 5/2005 | Karr et al. ................... | 711/114 |
| 2006/0053332 A1 | * | 3/2006 | Uhlmann et al. ............... | 714/2 |

* cited by examiner

*Primary Examiner* — Don Wong
*Assistant Examiner* — Kim T Nguyen
(74) *Attorney, Agent, or Firm* — Blakely, Sokoloff, Taylor & Zafman LLP (57) ABSTRACT

A storage server obtains metadata to describe a filesystem, then processes the metadata to locate a data block and reads the data block from a remote storage subsystem. Apparatus and software implementing embodiments of the invention are also described and claimed.

16 Claims, 7 Drawing Sheets

METHOD AND APPARATUS FOR CONCURRENT READ-ONLY ACCESS TO FILESYSTEM

RELATED APPLICATIONS

This application concerns material that may be related to that disclosed in copending application Ser. No. 11/321,431, entitled Method and Apparatus for Cloning Filesystems Across Computing Systems, filed Dec. 28, 2005.

FIELD OF THE INVENTION

The invention relates to data storage systems. More specifically, the invention relates to increasing the service capacity of a storage facility by providing additional servers to respond to clients that require read-only access to data.

BACKGROUND

A filesystem is a data structure (or set of data structures) and associated logic that facilitate tasks related to storing data in a computer system: allocating and freeing storage space on mass storage devices; reading and writing data; creating, modifying and deleting files; maintaining hierarchical directory structures; and so forth. Filesystem data structures are typically fairly complex, with interdependent fields that must be maintained consistently to avoid data corruption or loss. Because of this complexity and interdependence, filesystem operations do not lend themselves to parallelization. Consequently, improving the performance of a large file server (e.g. reducing operation latency or increasing client capacity) often entails purchasing new, faster hardware.

Methods of providing enhanced access to filesystem data without such expenditure may be of benefit in this field.

SUMMARY OF THE INVENTION

A storage server can provide additional data service capacity by obtaining metadata to describe a filesystem, processing the metadata to locate a data block in the filesystem, and reading the block from a remote storage subsystem.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF DRAWINGS

Figure 1:
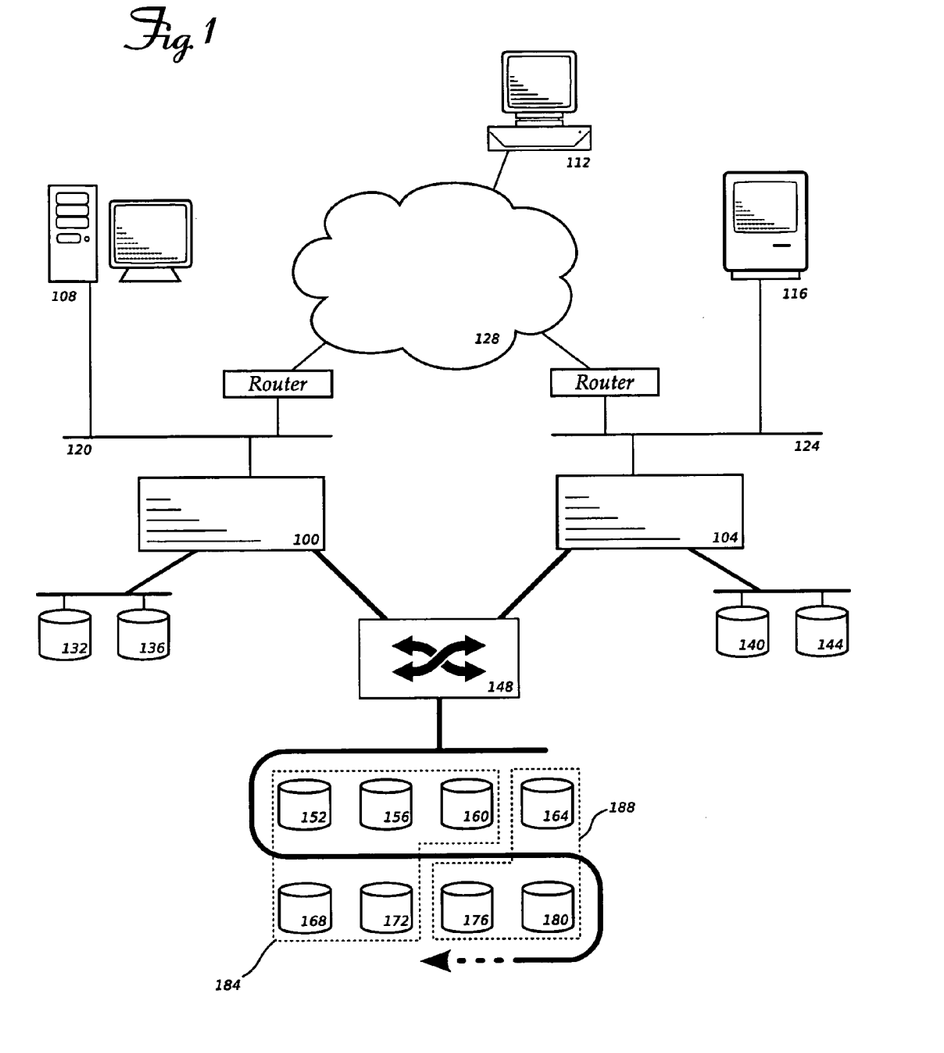
FIG. 1 shows a sample environment that implements an embodiment of the invention.

FIG. 1 shows a computing environment that can support an embodiment of the invention. Systems 100 and 104 are storage servers that provide data storage and retrieval services to clients 108, 112 and 116. (A "storage server" may be a traditional file server, or a server to provide data storage in units other than files—for example, in fixed-size blocks. The first type of server is often associated with the acronym "NAS" for Network Attached Storage, while the second type goes by the acronym "SAN" for Storage Area Network. Both types of server functionality are available commercially, for example in the Fabric-Attached Storage or "FAS" product line from Network Appliance, Inc. of Sunnyvale, Calif.)

Clients can communicate with storage servers 100 and 104 through local-area networks ("LANs") 120 and 124, or over a wide-area network ("WAN") 128 such as the Internet. Requests to create or delete files, to list directories, to read or write data, or to perform similar filesystem-related operations are transmitted from clients to a storage server, and responses are sent back.

Each storage server 100, 104 will have at least one mass storage device to store data and instructions for its own use, as well as to store user data files and information about the filesystem within which the files exist. In FIG. 1, each storage server has two "private" disks that are accessible only to that server (server 100 has disks 132 and 136; server 104 has disks 140 and 144). In the exemplary embodiment of the invention shown here, each storage server is also connected to a Fibre Channel ("FC") switch 148, which mediates access from the servers to an array of disks 152-180. Each server may be able to read or write to any of the disks in the FC array through switch 148, but software executing on the servers may cooperate to respect a convention that, for example, disks in group 184 may only be written by server 100 and are read-only with respect to server 104, while disks in group 188 may only be written by server 104 and are read-only to server 100. Henceforth, references to "read-only storage systems" will include storage systems on which data cannot be modified (e.g. because the data on the storage media is fixed and unmodifiable); systems on which data modification is prevented (e.g. by a write-locking switch or signal); as well as systems on which data could be written, but is not (e.g. by convention, agreement, or software design).

Mass storage devices that may be written by a server are said to be "local" to the server or "owned by" the server. Devices that may be read but not written by a server are considered to be "remote," and the reading server is said to be a "guest." The owner and one or more guests share access to the storage system. In FIG. 1, server 100 owns disks 152, 156, 160, 168 and 172 in group 184 and shares access to remote disks 164, 176 and 180 in group 188. Server 104 owns the local disks in group 188 and is a guest with respect to remote disks in group 184.

The servers may manage the raw data storage provided by the disks shown in FIG. 1 as a Redundant Array of Independent Disks ("RAID"), or some intermediate or lower-level hardware, firmware, or software entity (not shown) could provide reliable storage without any special arrangements by the servers. Embodiments of the invention operate logically at a higher level of abstraction, so the specific details of the storage subsystems will not be considered further. Instead, embodiments will be described with reference to one or more "storage systems" that provide either read-only or read-write access to a series of data blocks in a storage volume, each data block having a unique, sequential identifying number from zero to the total number of blocks in the volume. An Integrated Device Electronics ("IDE") or Small Computer System Interface ("SCSI") hard disk provides such an interface, and a RAID array can be operated in this way also. However, note that a data file in a filesystem can also be viewed as a sequence of read-only or read-write blocks, so embodiments of the invention can be nested: a filesystem as described here may be constructed in a data file, which is itself a file on a lower-level filesystem—even another filesystem contained in a data file on an even lower-level filesystem. Applications for one or two levels of nesting will be mentioned below; greater numbers of levels are possible, but may not be particularly useful.

Figure 2:
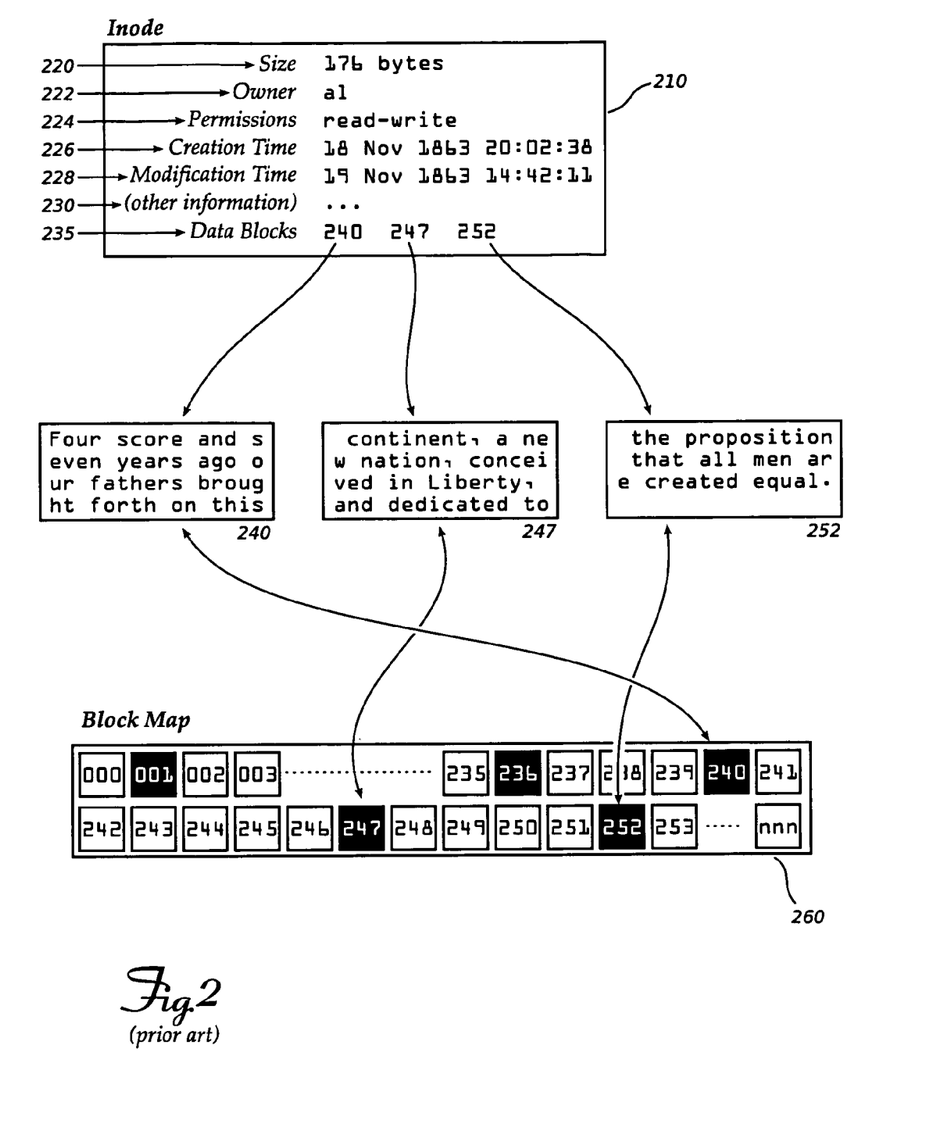
FIG. 2 shows some representative data structures that may be incorporated in a filesystem.

FIG. 2 shows a simplified representation of some of the data structures that may be included in a filesystem. A first structure called an "inode" 210 is a metadata container to contain metadata about a file in the filesystem (metadata may include, for example, the file's size 220, owner 222, permissions 224, creation time 226, modification time 228, and other information 230). The inode may also contain data block numbers 235 so that the file contents can be located on the storage volume. Every file is associated with an inode. The file associated with inode 210 is 176 bytes long, and those bytes are stored in data blocks 240, 247 and 252. (In this simple illustration, data blocks of only 64 bytes are used, but in practical systems, larger blocks—usually in sizes that are powers of two—may be used.) This simple filesystem also contains a block map structure 260, which indicates, for each data block in the storage volume, whether the block is in use. For example, in addition to blocks 240, 247 and 252 which are in use by the data file corresponding to inode 210, blocks 001 and 236 are marked "in use" in block map 260. Inodes themselves and the block map are data that may be stored in some of the data blocks of a storage system.

Note that neither of the data structures described above contains the file's name. The filesystem can implement named files and a hierarchical directory structure by placing the names and corresponding inode numbers in a file (which is itself associated with an inode), and treating that file specially as a directory. One inode in a filesystem is typically designated as the "root directory" of the filesystem; all other files should be accessible through an inode associated with a filename in the root directory or in a hierarchical descendant of the root directory.

Figure 3:
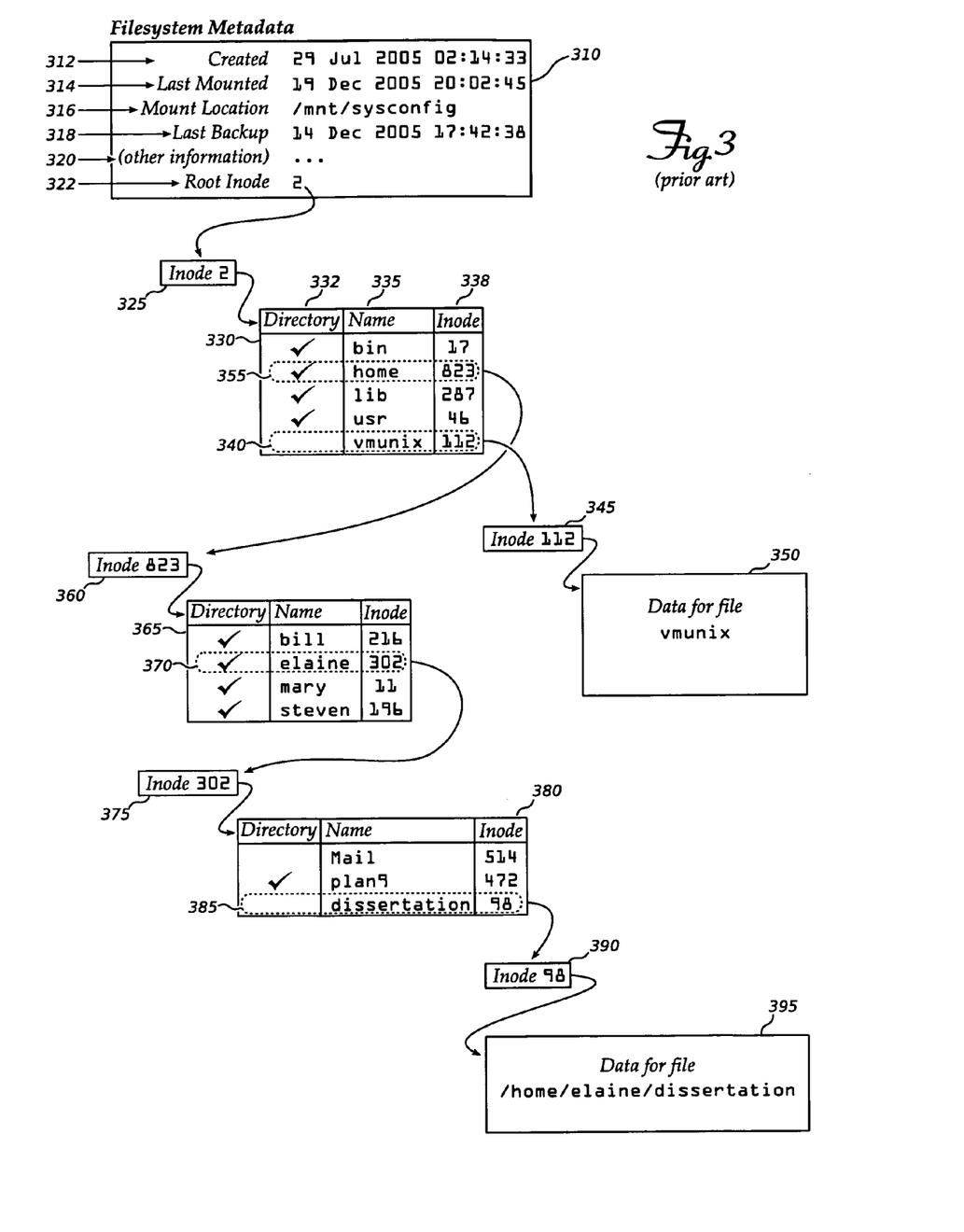
FIG. 3 shows a broader view of data structures in a filesystem.

FIG. 3 presents a broader view of a filesystem to illustrate the relationships between files, directories and inodes. Data structure 310 contains filesystem metadata—control information about the filesystem as a whole. For example, it may contain the date the filesystem was created 312, the date the file system was last mounted (placed in use on a computer system) 314, the last mount location 316, and the date of the last backup 318. Other information 320 may also be stored in the filesystem metadata structure. One important piece of information is the identity of the root inode 322, which permits filesystem processing logic to find other files and directories stored in the filesystem.

In the filesystem shown here, the root inode is inode 2 (325); as described with reference to FIG. 2, the inode provides block numbers for data blocks containing information on contents of the root directory. This information has been formatted as a table 330 containing a directory flag column 332, file (or directory) name column 335, and an inode number 338. Directory entries (rows in the table) may contain other information as well, but it is not relevant to descriptions of embodiments of the invention.

An entry in the root directory (or in any other directory) may identify a data file or another directory. For example, entry 340 identifies a file named "vmunix" whose data 350 can be located through inode 112 (345). Entry 355 identifies a second-level directory named "home" that is associated with inode 823 (360). Home 365 contains four third-level directory entries, including one named "elaine" 370 that is associated with inode 302 (375). Directory elaine 380 contains entries for two files and one sub-directory. Entry 385 identifies a file called "dissertation" associated with inode 98 (390) whose data 395 can be located through the inode.

Figure 4A:
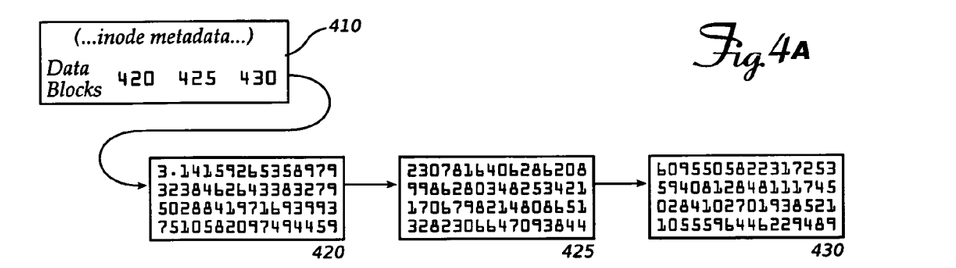
FIGS. 4A-4C show several ways a file's contents can be modified.
Figure 4B:
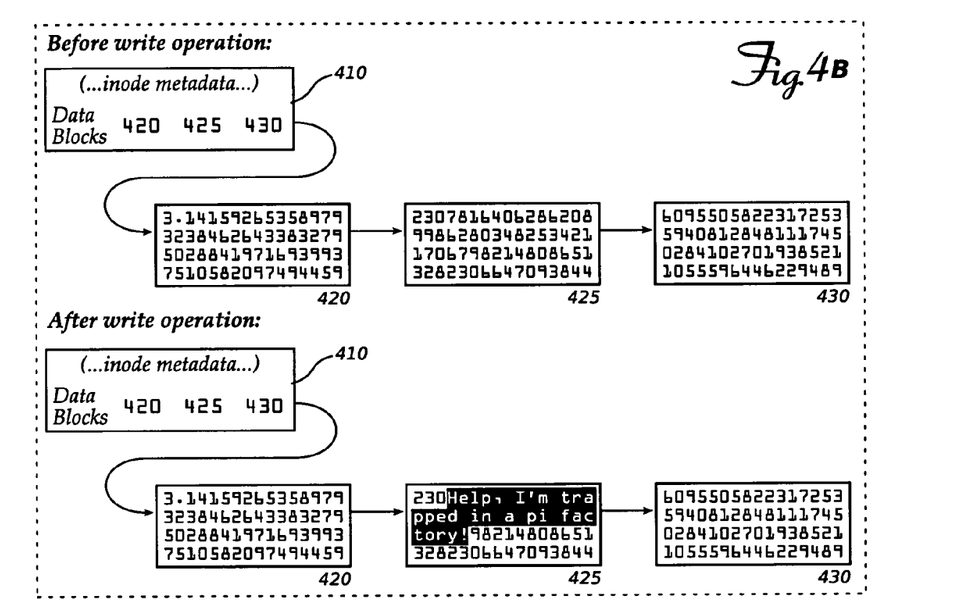
Figure 4C:
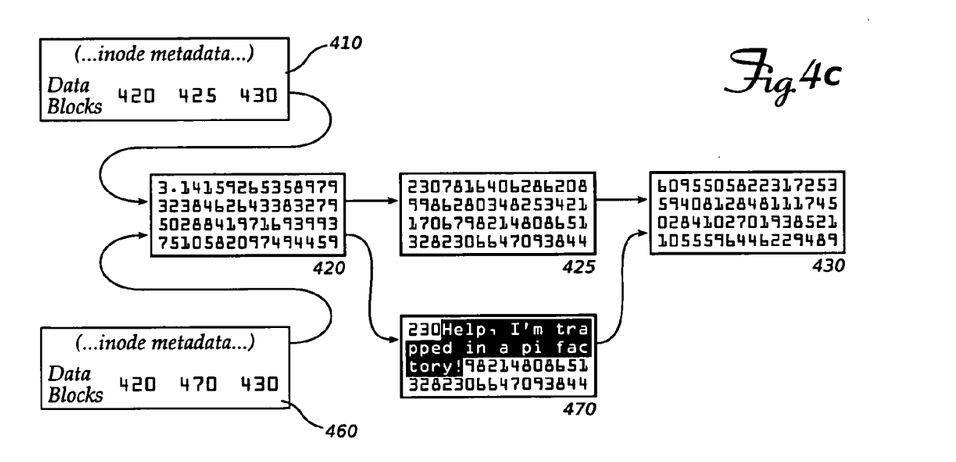

The filesystem data structures described with reference to FIGS. 2 and 3 support an operational mode that is used by embodiments of the invention. Consider a filesystem that contains various files and directories. FIG. 4A shows one of those files: inode 410 contains information to locate data blocks 420, 425 and 430. If the file contents are modified by a write operation, the new data might simply be placed into the currently-allocated data blocks, overwriting some of the existing contents as shown by before-and-after FIG. 4B. However, it may be useful to preserve the state of the file at a particular time, so instead of overwriting the existing file contents, a new inode 460 might be allocated and configured to refer to a new sequence of data blocks. Data blocks that are not modified can be shared between the original inode 410 and the new inode 460. This is illustrated in FIG. 4C, where original inode 410 continues to list data blocks 320, 325 and 330, while inode 460 lists data blocks 420, 470 and 430. Data block 470 contains the data of block 425 as modified by the write operation. The original version of the file is available through inode 410, while the modified version is available through inode 460. Thus, inode 410 describes the file at a point in time just before modifications began to be made through another inode. Eventually, inode 460 may be preserved as a second point-in-time version, and further modifications may be made within a third sequence of data blocks located by a third inode. The versions persist as long as the inodes describing them are maintained. They are read-only, because some of the data blocks from a file image may be shared with other file images (or with the active file), so modifications made through an image inode might cause unwanted changes in other files as well. For example, if a previously-saved image from a first time and a second image from a later time happened to share a data block, and the shared block was allowed to be modified through an inode from the second image, the same change would appear in the file in the first image. The change might be unexpected by software that referred to the first image, and could cause incorrect operation. The images described above will be referred to as read-only, persistent point-in-time images ("RPPI"). RPPIs are like the Snapshot® functionality available in storage server products from Network Appliance, Inc. of Sunnyvale, Calif.

RPPIs can be made of directories, too, since they are simply files that are treated specially for some purposes. Thus, the filesystem data structures shown in FIGS. 2 and 3 can support an RPPI facility to preserve the state of any file, directory, or complete hierarchy at a point in time. Future modifications to the files and directories occur within data block sequences identified by new inodes, while inodes and blocks that are not modified can be shared with one or more RPPIs. An RPPI of a complete filesystem may have a metadata structure to describe the RPPI and to locate the root directory; from that metadata, filesystem logic can descend the filesystem hierarchy to locate and read any file in the RPPI.

Although an RPPI is an image of a file system and consequently has all the complexity and data interdependencies of such a structure, the fact that its elements do not change can be exploited by an embodiment of the invention. Consider the following scenario: a storage server (such as server 100 in FIG. 1) creates a filesystem on storage devices in group 184, then makes an image of its contents at a point in time as an RPPI with a filesystem metadata structure. Server 104, which has read-only access to the storage devices in group 184, can access the RPPI according to the method of FIG. 5A. The accesses can occur concurrently with any activities of storage server 100, because neither storage server will modify the RPPI filesystem. In particular, both storage servers (or any of the storage servers, if more than one "remote" server is configured to serve the data on the shared storage subsystem) can retrieve the same data at substantially the same time. The servers can respond to co-pending requests from a number of clients without intra-request blocking, serialization, or sequencing restrictions.

Figure 5A:
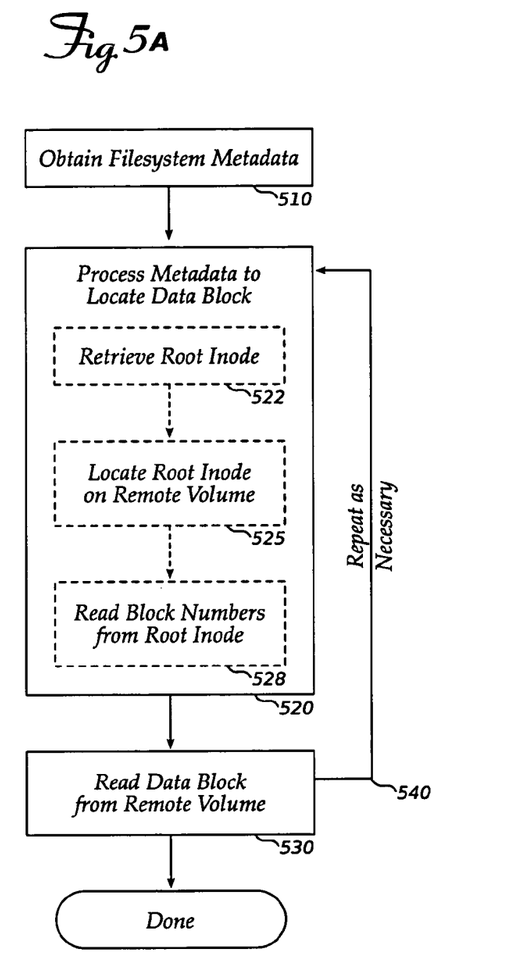
FIG. 5A outlines the operations of a system performing concurrent access to a read-only filesystem, and FIG. 5B gives a concrete example.

First, server 104 obtains metadata that describes the filesystem (510). The metadata may simply be read from the remote storage subsystem, but in one embodiment, server 104 may request the metadata from server 100 so that server 100 will be aware that the RPPI is in use and that its data should not be discarded. As an extension of this idea, in some embodiments server 104 will request a lock of the RPPI from server 100, and transmit "heartbeat" signals while the RPPI is still needed. After server 104 completes its use of the RPPI, it can release the lock. If server 104 crashes, server 100 may notice the failed heartbeat and discard the RPPI.

Returning to FIG. 5A, server 104 can process the metadata to locate a data block in the filesystem (520). This processing can include, for example, retrieving the root inode number from the metadata (522), locating the root inode on the remote volume (525), and reading a list of block numbers from the root inode (528). After the data block has been located, server 104 can read the data in the block from the remote volume (530).

Figure 5B:
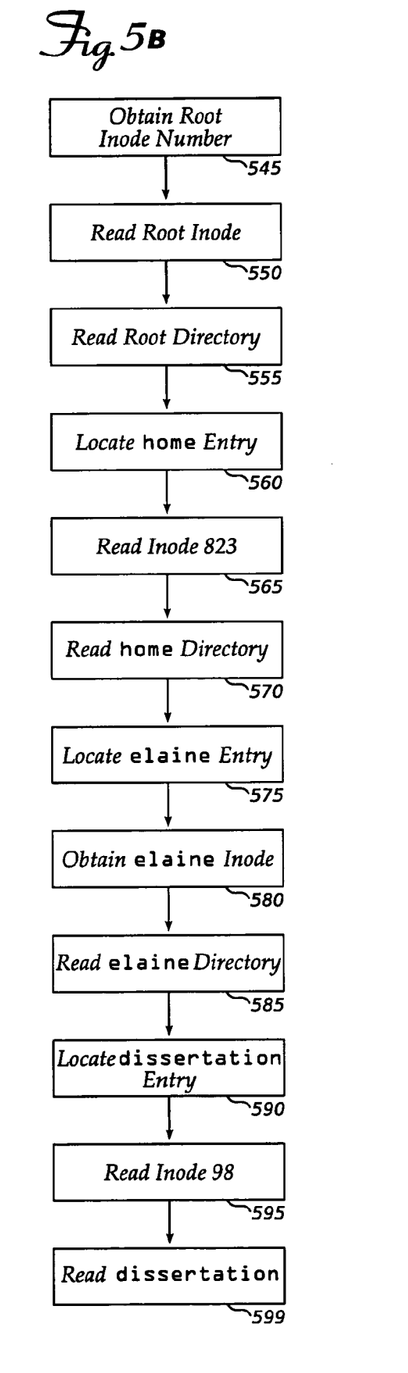

Operations 520 and 530 may be repeated as necessary to find and read any data block in any file in the filesystem described by the metadata (540). For example, FIG. 5B shows the operations of storage server 104 processing an RPPI of the filesystem shown in FIG. 3 to obtain data from the file named "/home/elaine/dissertation". The root inode number is obtained from filesystem metadata 310 (545) and inode 2 (325) is read (550) to find the data blocks comprising the root directory. The root directory 330 is read (555) and the "home" entry is located (560) to obtain the next inode number, 823. Inode 823 is read (565) to find the data blocks comprising the home directory 365, and those data blocks are read (570). The "elaine" entry is located (575) and its inode number 302 is obtained (580). The data blocks comprising the "elaine" directory are read (585) and the "dissertation" entry 385 is located (590). Finally inode number 98 is read to find the data blocks that make up the "dissertation" file (595), and the contents of the file itself may be read (599). Note that, while storage server 104 is searching for and reading the file "/home/elaine/dissertation", server 100 may also be searching for and reading files in the filesystem. In fact, server 100 may be reading the very same file on behalf of another client system. The servers provide parallel access paths to the same data, thus increasing the amount of processing power and network bandwidth available to serve the data from the shared storage subsystem.

The concurrent, read-only access to the RPPI filesystem that is provided by storage server 104 may be of use to several types of clients. For example, external clients that do not need (or do not have) write access to the filesystem can receive service from server 104 instead of relying on server 100. Also, server 104 may be provided with backup facilities such as a tape drive or tape library, and may use its read-only access to perform backups of the RPPI filesystem without affecting server 100's response to its clients.

As mentioned in paragraph [0018], data for a filesystem and the files and directories it organizes may be stored directly on a mass storage subsystem such as a hard disk or RAID array, or in a file in a lower-level filesystem. (A file that contains a filesystem is called a "container file.") The latter arrangement may require additional processing to find and read data in a file, since the data block must be located once by reference to the filesystem data in the container file, and again by reference to the data of the filesystem where the container file resides. Each level of nesting requires filesystem parsing logic to locate data blocks by block numbers or addresses within the filesystem's storage. One level of nesting provides certain advantages to offset the extra processing, but multiple levels of nesting are less likely to be useful.

Figure 6:
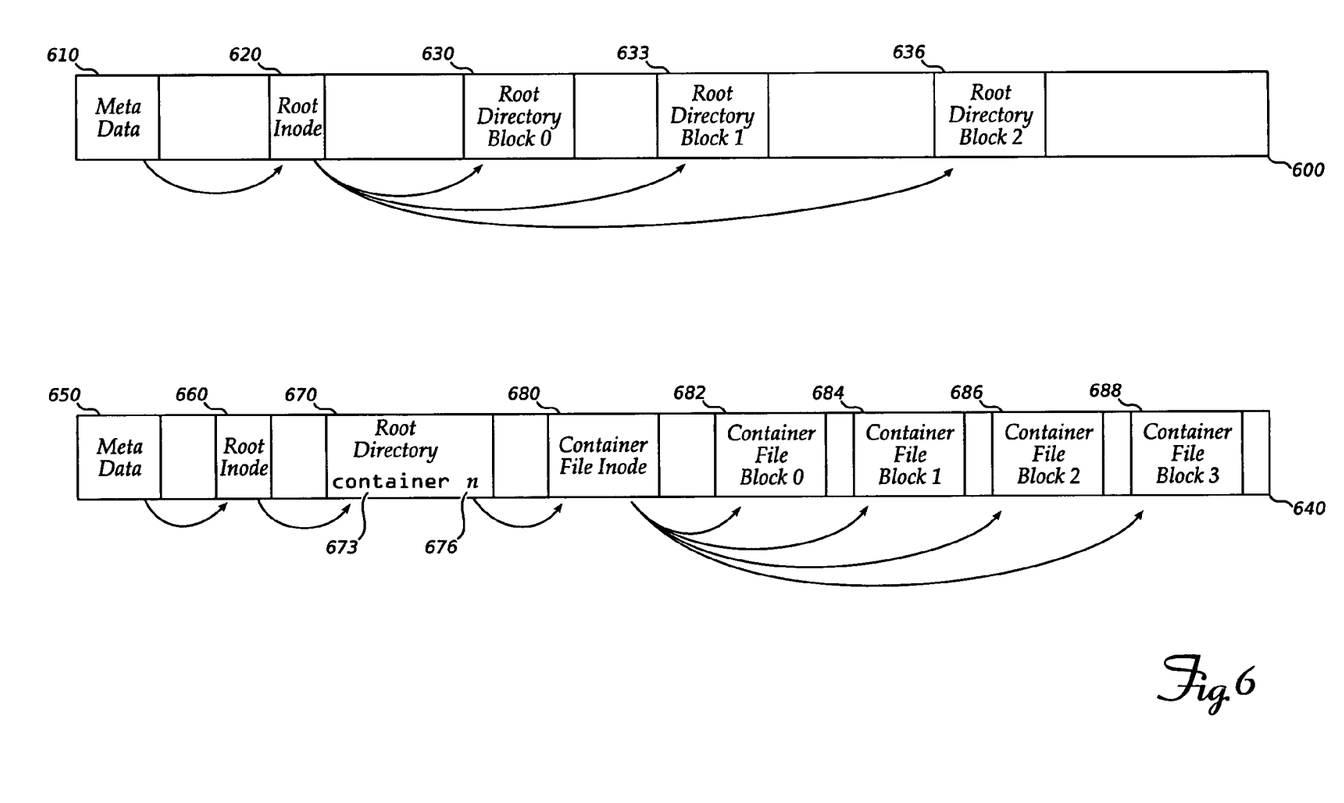
FIG. 6 shows how a filesystem can be nested within a container file on a lower-level filesystem.

FIG. 6 shows some portions of a filesystem 600: filesystem metadata 610, root inode 620, and data blocks containing the root directory data 630, 633 and 636. Filesystem parsing logic can compute the block number of a root directory data block by following the method outlined in FIG. 5A. If filesystem 620 is stored directly on a storage subsystem, then the block number thus computed may be presented to the storage subsystem and the data in the block read. The block number identifies a physical data block on the underlying storage system volume, so it may be described as a physical volume block number ("PVBN").

However, if filesystem 600 has been constructed within a container file, then the block number computed above does not identify a physical data block. Instead, it identifies a block at a particular offset within the container file, and may be described as a virtual volume block number ("VVBN"). To obtain the desired data, the filesystem parsing logic must examine the filesystem where the container file resides. For example, element 640 shows a second filesystem including metadata 650, root inode 660 and root directory 670 with container file name 673 and inode number 676. From the container file inode 680, filesystem parsing logic can obtain the block numbers of container file data blocks 682, 684, 686 and 688.

If the virtual volume block number computed by processing data in filesystem 600 is 3, then the desired data might be located in container file data block 686. The block number of container file data block 686 may be determined through the examination of container filesystem 640 and, if the container filesystem is stored directly on a storage subsystem, the block number may be used as a PVBN to read the desired data. If the container filesystem has been constructed within a lower-level container file, the filesystem parsing must be repeated.

The process of locating a desired data block explained with reference to FIG. 6 may be concisely expressed as translating a virtual volume block number ("VVBN") to a physical volume block number ("PVBN"). If multiple layers of container files are in use, the translation will have an equal number of steps from VVBN to lower-level-WBN and so on, until a PVBN is obtained. Note that although the guest storage server has access to the storage subsystem where the container file resides, the container file's filesystem may not be in a read-only state, so the guest storage server may not be able to perform the VVBN-to-PVBN translation itself because of changes to the container file's filesystem that have not yet been written to the storage system. Therefore, in some embodiments, the guest storage server may present the VVBN to the owner storage server and receive a corresponding PVBN calculated by the owner. The owner storage server will have access to any cached data necessary to locate the desired block of the container file within the container file's filesystem.

Although the filesystem parsing and VVBN-to-PVBN translation methods appear to be tedious and time-consuming, storage server 104 may cache data to improve its performance. If it is desired that server 104 begin serving data from a new, later RPPI, it can freeze its operations, discard cached data, load new filesystem control information from the filesystem metadata, and then "thaw" the filesystem by resuming operations with the new RPPI.

Figure 7:
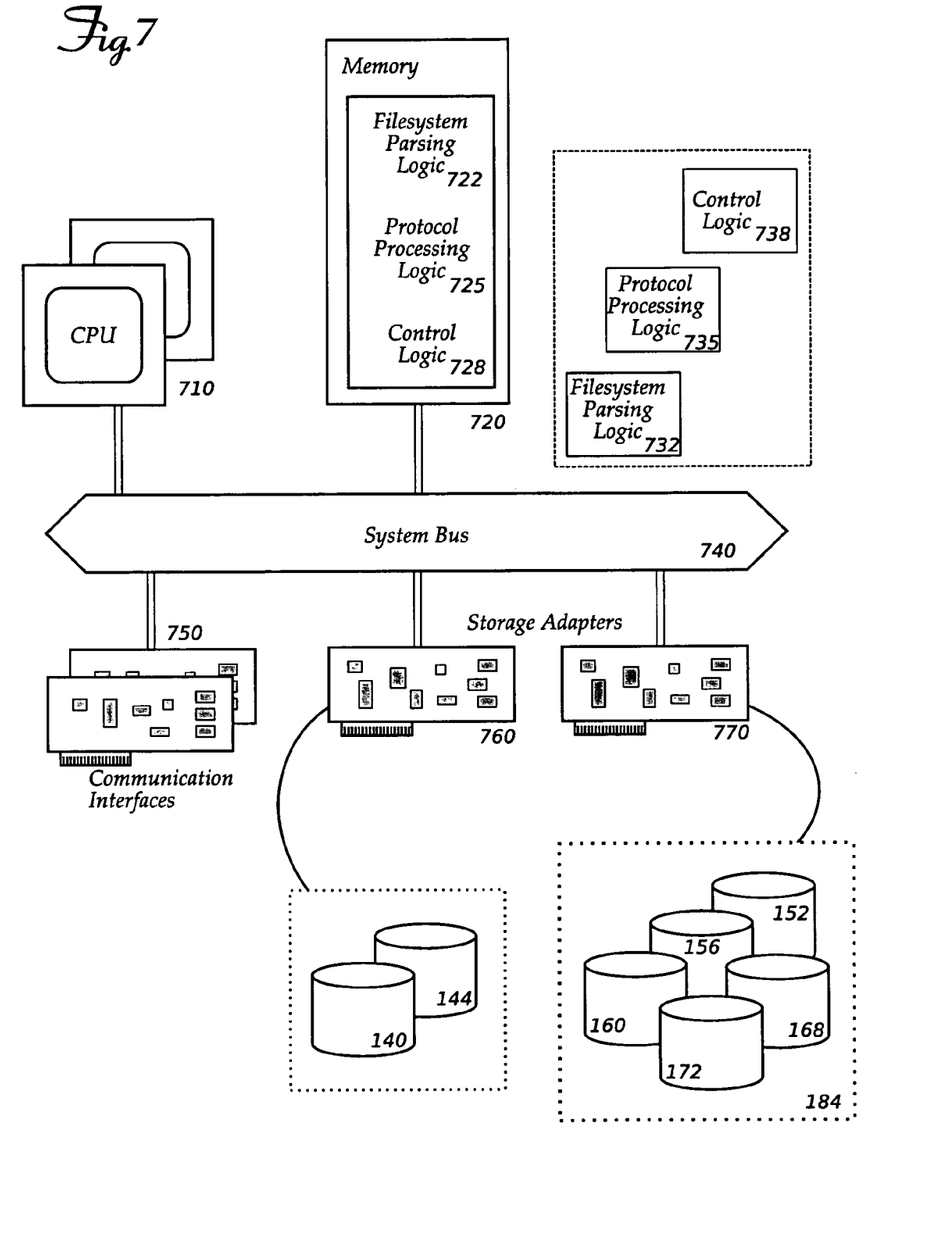
FIG. 7 is a block diagram of a system that could implement an embodiment of the invention.

Hardware, firmware and software to implement the methods described above may be incorporated in a system like that shown in FIG. 7. One or more central processing units ("CPUs" or "processors) 710 may execute instructions contained in memory 720. These instructions may perform portions of methods of an embodiment. For example, filesystem parsing logic 722 may locate data blocks in a filesystem on a remote storage subsystem based on control information about the remote filesystem and data from the remote storage subsystem. The control information may be stored on the remote storage subsystem or on a local storage system. Memory 720 may also contain protocol processing logic 725 to interpret protocol requests from clients, and control logic 728 to coordinate the activities of filesystem parsing logic 722 and protocol processing logic 725 so that the system can read a data block corresponding to a protocol request and return the content of the data block to the requesting client. In some embodiments, filesystem parsing, protocol processing and control logic may be implemented as hardware circuits 732, 735 and 738 instead of software instructions. Logic to translate VVBNs to PVBNs may be incorporated within filesystem parsing logic 722 or implemented as a separate hardware or software module.

A system may also include one or more communication interfaces 750 to exchange requests and data with clients and storage adapters 760 and 770 to communicate with mass storage subsystems such as local disks 140 and 144 or remote (read-only) disks 152, 156, 160, 168 and 172.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that systems to provide concurrent read-only access to filesystems can also be implemented by software and hardware that distribute the functions of embodiments of this invention differently than herein described. Such variations and implementations are understood to be encompassed by the following claims.

We claim:

1. A computerized method comprising:
    obtaining, by a local storage server computer, metadata to describe hardware characteristics of a remote filesystem, the metadata stored in a local mass storage subsystem owned by the local storage server computer;
    processing, by the local storage server computer, the metadata to locate a data block in the remote filesystem, the data block stored in a remote shared-access mass storage subsystem owned by a remote storage server computer, wherein the local storage server computer has read-only access to the remote shared-access mass storage subsystem; and
    reading, by the local storage server computer, the data block from the remote shared-access mass storage subsystem using the metadata without requesting the data block from the remote storage server computer, wherein the local storage server computer reads the requested data block from the remote shared-access mass storage subsystem while the remote storage server computer accesses the remote shared-access mass storage subsystem.

2. The computerized method of claim 1 wherein the metadata describes a read-only persistent point-in-time image of the filesystem.

3. The computerized method of claim 1 wherein obtaining metadata comprises reading the metadata from the local mass storage subsystem.

4. The computerized method of claim 1 wherein processing the metadata yields a physical volume block number to locate the data block on the remote shared-access mass storage subsystem.

5. The computerized method of claim 1 wherein processing the metadata yields a virtual volume block number, the method further comprising:
    translating the virtual volume block number to a physical volume block number.

6. The computerized method of claim 1, further comprising:
    processing the data contained in the block to locate a second data block in the filesystem; and
    reading the second block from the remote shared-access mass storage subsystem.

7. An apparatus comprising:
    a local processor coupled to a local bus;
    a local memory coupled to the local processor through the local bus;
    a local storage interface coupled to the local bus;
    a remote mass storage subsystem communicatively coupled to the local bus;
    instructions executed by the local processor from the local memory to cause the local processor to read data, through the local storage interface, from the remote mass storage subsystem using hardware control information without requesting the data from a remote storage server, wherein the local processor reads the requested data from the remote mass storage subsystem while the remote storage server accesses the remote mass storage subsystem and wherein the remote mass storage subsystem is owned by the remote storage server and wherein the local processor has read-only access to the remote mass storage subsystem;
    a local mass storage subsystem coupled to the local bus to store the hardware control information about a filesystem on the remote mass storage subsystem; and
    filesystem parsing logic stored in the local memory and executed on the local processor to cause the local processor to locate a data block on the remote mass storage subsystem based on the hardware control information from the local mass storage subsystem and filesystem information from the remote mass storage subsystem.

8. The apparatus of claim 7, further comprising:
a communication interface to receive a request from a client;
protocol processing logic to interpret the request; and
control logic to read a data block corresponding to the request from the remote mass storage subsystem and return a content of the data block to the client.

9. The apparatus of claim 7 having read-only access to the remote mass storage subsystem.

10. The apparatus of claim 7 wherein a filesystem interpreted by the filesystem parsing logic is a read-only, persistent point-in-time image.

11. The apparatus of claim 7 wherein the filesystem parsing logic is to compute a physical volume block number based on the control information and filesystem information.

12. The apparatus of claim 7 wherein the filesystem parsing logic is to compute a virtual volume block number based on the control information and filesystem information, the apparatus further comprising:
translation logic to translate the virtual volume block number to a physical volume block number.

13. A computerized method comprising:
storing a remote filesystem on a remote shared-access mass storage subsystem owned by a remote storage server computer;
receiving, at the remote storage server computer, a first request for data in the remote filesystem;
processing, by the remote storage server computer, the first request;
returning, by the remote storage server computer, data corresponding to the first request;
receiving, at a local storage server computer, a second request for data in the remote filesystem;
parsing, by the local storage server computer, the remote filesystem to locate a virtual volume block number corresponding to a data block;
transmitting, by the local storage server computer, the virtual volume block number to the remote storage server computer;
receiving, by the local storage server computer, a physical volume block number corresponding to the virtual volume block number;
reading, by the local storage server computer, data from the remote shared-access mass storage subsystem at the physical volume block number without requesting the data from the remote storage server computer; and
returning, by the local storage server computer, data corresponding to the second request, wherein the local storage server computer processes the second request while the remote storage server computer processes the first request.

14. The computerized method of claim 13 wherein the filesystem is a read-only persistent point-in-time image ("RPPI").

15. A computerized method comprising:
creating, by a remote computer, a read-only persistent point-in-time image ("RPPI") of a filesystem stored in a container file on a mass storage subsystem;
receiving, by the remote computer, a virtual volume block number ("VVBN") referencing a block of the container file from a local computer;
translating, by the remote computer, the VVBN to a physical volume block number ("PVBN");
transmitting, by the remote computer, the PVBN to the local computer; and
reading, by the local computer, the block of the mass storage subsystem that corresponds to the PVBN without the local computer requesting the block from the remote computer, the reading occurring while the remote computer reads data from the mass storage subsystem.

16. The computerized method of claim 15, further comprising:
storing a copy of the filesystem on a backup medium.

* * * * *